Figure 3:
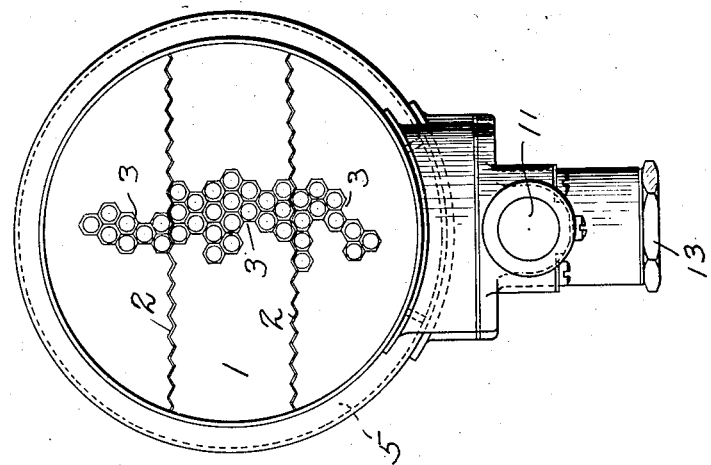

June 21, 1932.    R. G. DYKEMAN ET AL    1,864,052
OIL TEMPERATURE REGULATOR
Filed July 2, 1931    3 Sheets-Sheet 1

Inventors
Reuben G. Dykeman
and Dudley W. Watkins
By F. L. Walker
Attorney

June 21, 1932.  R. G. DYKEMAN ET AL  1,864,052
OIL TEMPERATURE REGULATOR
Filed July 2, 1931   3 Sheets-Sheet 2
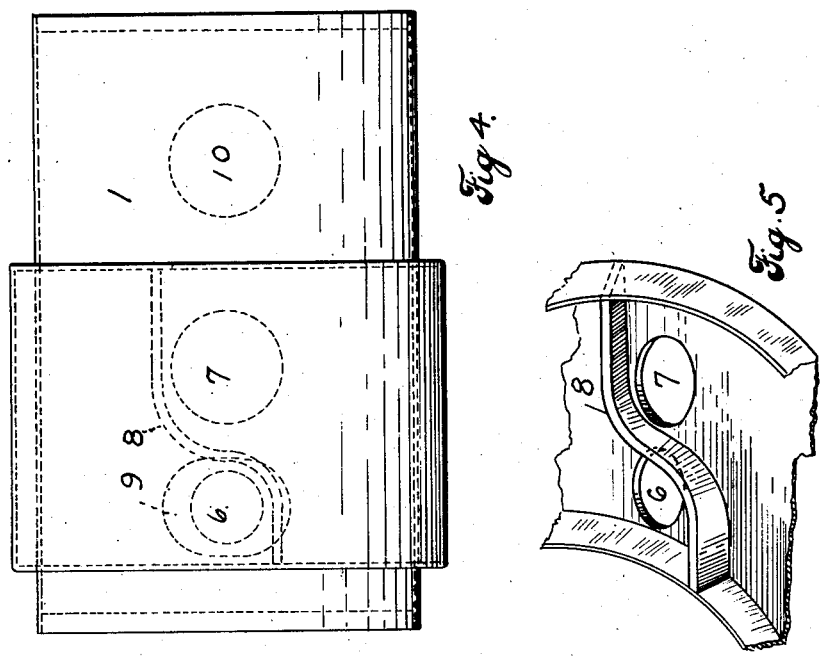
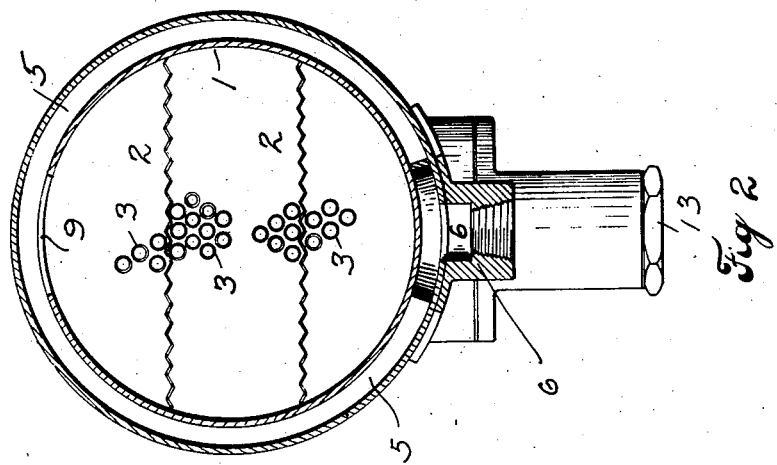
INVENTORS
Reuben G. Dykeman
and Dudley W. Watkins
by J. L. Walker ATTORNEY June 21, 1932. R. G. DYKEMAN ET AL 1,864,052
OIL TEMPERATURE REGULATOR
Filed July 2, 1931   3 Sheets-Sheet 3

Inventors
Reuben G. Dykeman
and Dudley W. Watkins
By L. Walker
Attorney

Patented June 21, 1932

1,864,052

UNITED STATES PATENT OFFICE

REUBEN G. DYKEMAN, OF DAYTON, AND DUDLEY W. WATKINS, OF FAIRFIELD, OHIO, ASSIGNORS TO UNITED AIRCRAFT PRODUCTS, INC., OF DAYTON, OHIO, A CORPORATION OF OHIO

OIL TEMPERATURE REGULATOR

Application filed July 2, 1931. Serial No. 548,353.

This invention relates to heat exchange devices and particularly to a cooling device and thermal regulator for oils and other thermally changeable fluids.

In the development of high speed machinery and especially high speed motors such as are used in aeroplanes, and in more recent types of automobile and motor boat motors, it has become necessary to provide for cooling of the lubricant. The present invention embodies a radiator through which the oil is circulated after use before being returned to the motor or other apparatus. Lubricating oils being quite thermally sensitive tend to thicken or congeal in the radiator when the motor or other apparatus with which the device is used, is at rest. Thus flow of oil is retarded at starting. This difficulty is quite aggravated at low temperatures especially in the case of an aeroplane flying at high altitudes where temperatures far below zero (F) are encountered causing the oil to solidify in the radiator. Obviously under such temperature conditions little or no cooling of the oil is required.

The present invention provides for automatically cooling by passing the warm oil received from the motor around the congested radiator until the radiator contents are "thawed" or sufficiently warmed to become equally fluid, whereupon the oil stream is automatically shunted through the radiator.

The object of the invention is to simplify the structure as well as the means and mode of cooling units whereby they will not only be cheapened in construction, but will be more efficient in operation, uniform in action, automatically controlled, and unlikely to get out of repair.

A further object of the invention is to provide a suitable cooler unit for lubrication systems, and to provide means therein for automatically thawing congealed lubricant and relieving congestion within the radiator.

A further object of the invention is to provide an automatic by-pass for the liquid in the event the radiator or cooling device is obstructed or the flow of liquid therethrough retarded.

A further object of the invention is to utilize the circulation of warm liquid through the by-pass for relieving the congested condition of the radiator.

A further object of the invention is to provide an automatic control means governed by variation of flow resistance.

With the above primary and other incidental objects in view, the invention consists of the features of construction, the parts and combinations thereof, and the mode of operation, or their equivalents, as hereinafter described and set forth in the claims.

Figure 1:
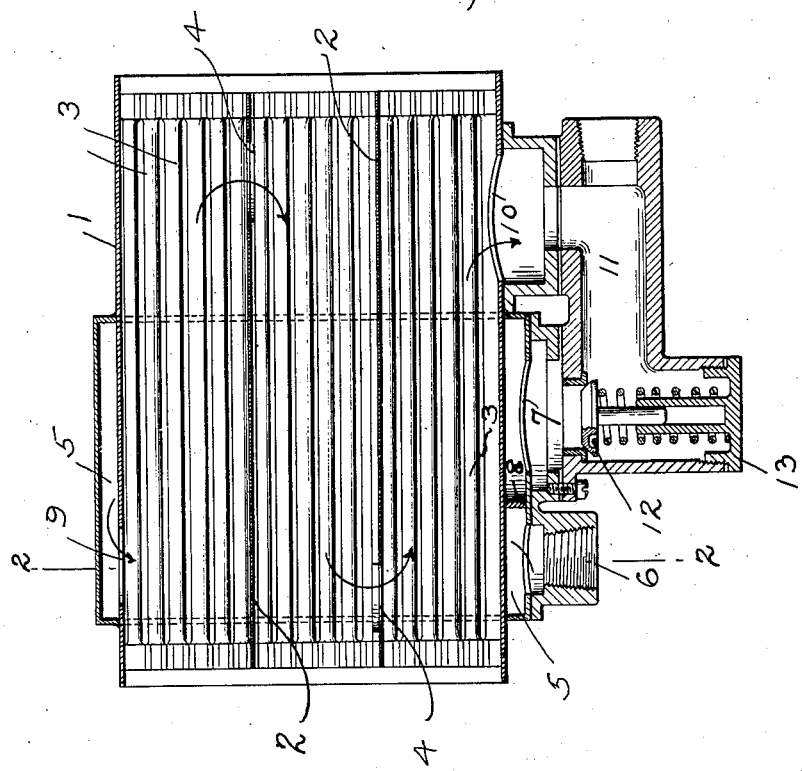
Figure 6:
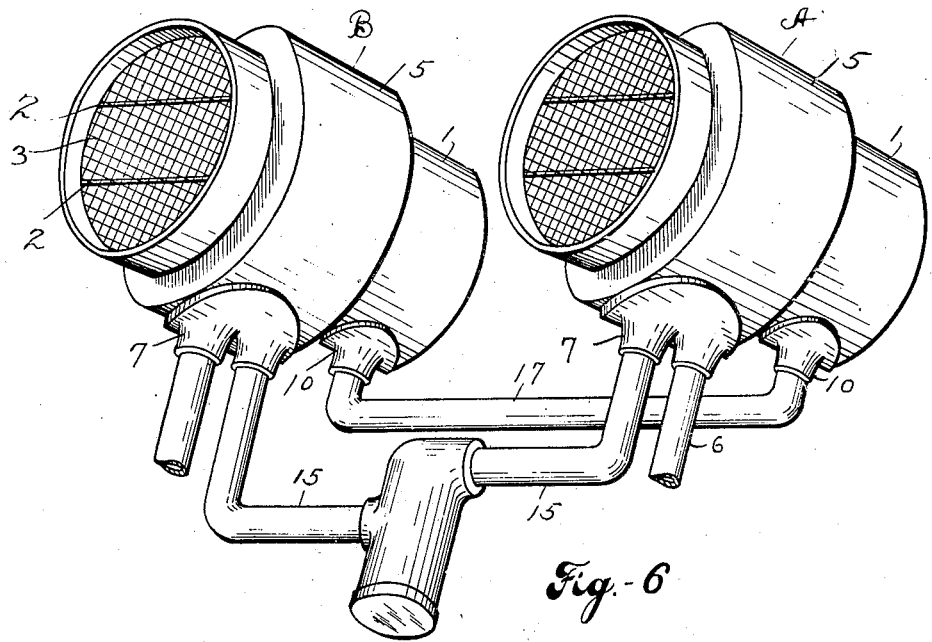
Figure 7:
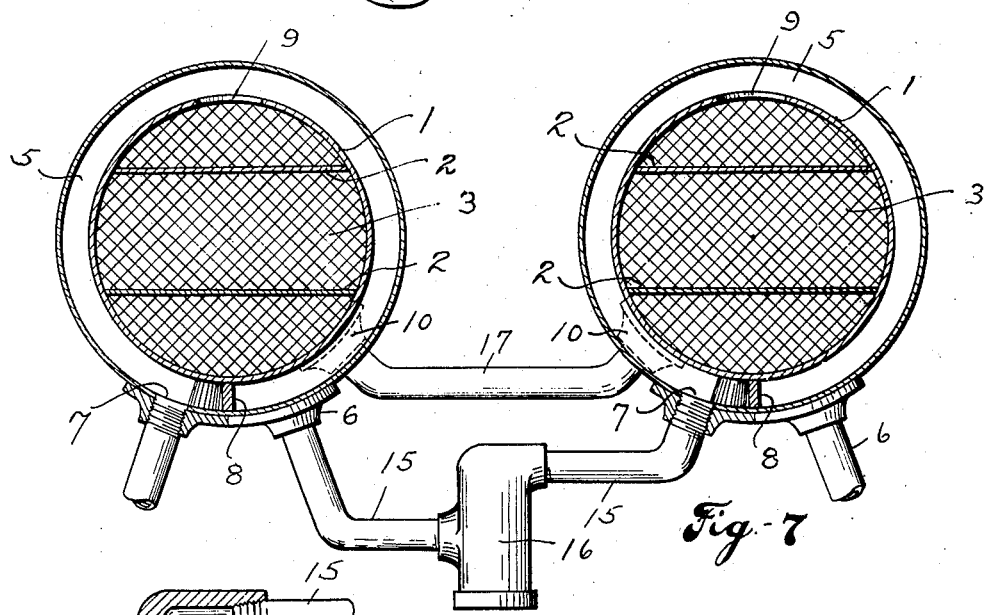
Figure 8:
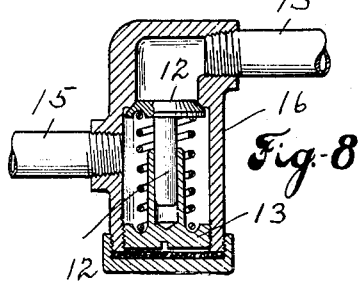

Referring to the accompanying drawings wherein is shown the preferred but obviously not necessarily the only form, of the embodiment of the invention, Fig. 1 is a longitudinal sectional view of the assembled cooling unit. Fig. 2 is a transverse section thereof on line 2—2 of Fig. 1. Fig. 3 is an end elevation and Fig. 4 is a top plan view. Fig. 5 is a fragmentary perspective view. Fig. 6 illustrates a dual type of apparatus wherein two units are interconnected in series with a common control valve therebetween. Fig. 7 is a transverse sectional view of the dual type of apparatus, and Fig. 8 is a sectional detail of the by-pass valve.

Like parts are indicated by similar characters of reference throughout the several views.

Referring to the drawings, 1 is a radiator which may be of any suitable type, which for illustrative purposes is shown as of a tubular air cooled type such as commonly used in automobile radiators. It consists of a cylindrical shell 1 preferably though not necessarily divided by baffles 2 into a succession of compartments each filled with parallel tubes 3 open at their ends for circulation of air therethrough and spaced apart to afford circulatory passages therebetween for circulation of the oil or other lubricant to be cooled. Intercommunicating ports 4 are provided between the compartments of the radiator through the baffles 2 at alternating ends of the radiator. Obviously, forms of air cooled radiator construction other than the tubular form illustrated may be utilized or for stationary installations, a water cooled or similar type of radiator unit may be employed.

Surrounding the radiator unit is a jacket forming thereabout an annular by-pass or warming compartment 5. A supply or inlet connection 6 leads to the by-pass or warming compartment 5 and an outlet 7 is provided therefrom. A baffle or division wall 8 within the by-pass or warming compartment separates the inlet and outlet connections 6 and 7, thus compelling the inflowing liquid to pass entirely around the radiator unit before reaching the outlet 7.

An inlet port 9 is provided in the radiator shell 1 through which the radiator unit communicates with the by-pass passage and receives its supply of liquid to be cooled therefrom. The radiator unit is provided with a discharge port 10 leading to an outlet connection 11 which is common to both the by-pass or warming chamber and the radiator unit.

Intermediate the outlet 7 from the by-pass or warming compartment and the outlet conduit 11 is a spring tensioned relief valve 12 having a resistance somewhat greater than the normal flow resistance of the liquid passing through the radiator unit but less than the resistance of thickened or congealed material within the radiator.

The tension or yielding resistance of the valve to liquid flowing through the by-pass or warming compartment is so proportioned to the resistance to the flow of thickened or congested liquid in the radiator that whenever the resistance of such chilled or congealed material in the radiator exceeds the tension or yielding resistance of the valve, the valve will be forced open and the warm oil will circulate through the by-pass or warming compartment 5. It will be understood that when conditions are such that the liquid will be chilled, thickened or congealed in the radiator thus increasing the flow resistance, the condition of the oil received from the motor or other apparatus will not be such as to require material cooling other than such as it shall receive in passing through the warming compartment 5 in contact with the wall of the radiator. However the warming effect of circulation of liquid through the by-pass or warming compartment is sufficient to raise the temperature of the material within the radiator, thereby thawing or liquefying it sufficiently to reduce its flow resistance below that of the tensioned valve and thereafter, the incoming liquid supply, following the course of least resistance will circulate through the radiator and not through the warming compartment. The transition from the radiator to the warming compartment and vice versa is effected entirely automatically and is dependent upon temperature conditions and hence fluidity of the material contained in the radiator unit. This is to some extent governed by the tension of the valve 12. The valve spring may be made more or less resistant and is adjusted by means of the screw threaded head 13 or by inserting shims or washers beneath the spring.

By providing adjustable tension for the actuating spring of the release valve 12, either by introducing shims beneath the spring or by suitable screw threaded adjustment, the temperature of the oil or other material being passed through the cooler may be regulated. By changing the tension of the spring whereby the valve will yield to greater or less pressure the resulting temperature of the liquid may be proportionately varied.

Not infrequently it occurs that an oil temperature regulator or cooler of the present type must be installed in quite restricted spaces especially in an airplane fuselage. It is sometimes found that the available space will not accommodate a unit of sufficient size to afford the necessary cooling or temperature regulation requirement. In such case it may be found desirable to connect two or more units either in series or in parallel. The preferable construction is to connect such units in series as is shown in Figs. 6 and 7. As therein illustrated the two units A and B are of constructions similar to that illustrated in the preceding figures of the drawings and may be arranged in either axial alinement or side by side as the available space, in which they are to be installed, permits. In such multiple installation which, if desired may be extended to include an additional unit, the warming compartments or circumferential jackets are directly interconnected by a valved conduit 15 which connects the outlet 7 of the circumferential jackets or warming compartments of the unit A with the intake orifice 6 of the circumferential jackets or warming compartment 5 of the second unit B. The valve 16 interposed in the conduit 15 between the respective units may be of any suitable tensioned construction whereby the valve will yield to a predetermined pressure thereby causing a back pressure to be created before allowing the liquid to pass. Likewise the outlet 10 of the radiator section of the unit is directly connected by a conduit 17 with the orifice 10 of the succeeding unit B which, in this instance, is utilized as the inlet orifice instead of an outlet. The lubricant admitted to the radiator section of the unit B after circulating through the unit is discharged therefrom through the opening 9 at the top of such unit into the circumferential jacket or warming compartment 5 from which it is discharged through the outlet 7 of such unit. Thus the liquid material is circulated in reverse direction through the second unit B. In operation of the duplex temperature regulator, the warm lubricant enters the circumferential jacket or warming compartment 5 of the initial unit A through the inlet 6 which is divided from the outlet by the intermediate baffle wall 8. The warm lubricant flows thence through the jacket 5 around the radiator section. If the lubricant within the radiator section is congealed or solidified to such extent that its resistance to flow is greater than the resistance of the tensioned line valve 16, the warm lubricant will flow around the "frozen" radiator section, through the warming jacket or compartment to the outlet 7 and thence through the interconnecting conduits 15 to the second unit B. The spring tensioned valve 16 in this conduit 15 affords sufficient resistance to the flow to create a back pressure which is exerted upon the congealed material within the radiator section of the unit A. This back pressure may be varied at will by changing the tension of the valve spring of such valve 16. The warm liquid from the conduit 15 entering the jacket 5 of the second unit B flows through such jacket or compartment around the radiator section thus warming the contents of such radiator section, and is discharged through the outlet 7 from the unit B. The warming influence of the circulating lubricant within the circumferential jacket or warming compartment 5 "thaws" or reduces the congealed material within the radiator section until its resistance is less than that of the tensioned valve 16. Thereupon the warm lubricant entering the jacket 5 of the unit A through the inlet 6 passes therethrough to the opening 9 at the top of the jacket into the radiator section and after circulating through the radiator section wherein its temperature is materially reduced, such liquid material passes through the outlet 10 from such radiator section to the conduit 17 by which it is subjected to the radiator section of the second unit B. It enters this second unit through the orifice 10 which corresponds to the outlet of the first unit. After circulating in reverse direction through the radiator section of the second unit B the cooled material is discharged through the orifice 9 into the circumferential jacket 5 from which it passes through the outlet 7. Thus the liquid to be treated is conducted progressively through the circumferential jacket or warming compartment of the respective units until the congealed material within the radiator sections thereof is released whereupon the circulation is automatically changed to include the respective sections of the two units.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect and the invention is therefore claimed in any of its forms or modifications within the legitimate and valid scope of the appended claims.

Having thus described my invention, I claim:

1. In a cooler for a congealable liquid, a radiator body having passages for the circulation of the liquid to be cooled, a warming jacket surrounding the radiator body, a supply inlet to the jacket, an inlet port from the jacket to the radiator, an outlet conduit leading from the radiator and a valved port between the jacket and the outlet conduit and a tensioned valve controlling said last mentioned port.

2. A pair of radiator units having circulating passages therein, said units being connected in series, a jacket compartment surrounding one radiator unit and communicating therewith, common inlet and outlet connections, and a pressure operated valve between the jacket compartment and the outlet.

3. A cooler for a thermally responsive liquid, a radiator section and a pair of warming compartments for liquefying the contents of the radiator, said compartments being connected in series, common inlet and outlet connections, the liquid to be cooled being circulated through the warming compartments so long as the congealed liquid in the radiator offers greater resistance to flow, and flow resisting means greater than the normal resistance of the radiator for retarding the flow through the warming compartment, said means being disposed intermediate said warming compartments.

4. A cooler for a thermally responsive liquid including a pair of radiator units connected in series, and a warming passage therefor having a normal flow resistance greater than that of the radiator units, said warming passage completely surrounding said radiator units, common inlet and outlet connections therefor, and a regulator causing the warm liquid to be cooled circulating through the warming passage so long as cooled liquid in the radiators offers greater resistance to flow and serving to reduce the resistance thereof, and flowing through the radiator when the contents thereof have been warmed sufficiently to reduce their resistance to flow below that of the warming passage.

5. A cooler for a thermally responsive material including a radiator having passages through which the material is circulated, and within which the material will congeal when chilled, a pair of passages connected in series for the circulation of warm material in proximate relation with the congealed material within the radiator to reduce the flow resistance thereof, and means disposed intermediate said passages for automatically controlling the flow of material alternately through the radiator and through the warming passages.

6. A cooler for a thermally sensitive liquid including a pair of radiators having therein circulatory passages through which the liquid will flow freely when warm and through which the flow of liquid is retarded when cool, said radiators being connected in series and means for automatically supplying warmth to said radiators in accordance with the resistance to flow therethrough for conditioning the material therein, said means completely surrounding said radiator units so as to warm a continuous path around the periphery of said units.

7. A cooler for a thermally sensitive liquid including a radiator assembly having therein circulatory passages through which the liquid will flow freely when warm and through which the flow of liquid is retarded when cool, and a pair of by-pass passages connected in series and disposed in proximate relation to the radiator assembly through which warm liquid is automatically diverted when the resistance to flow through the radiator increases, and from which warmth is transmitted to the radiator to recondition the contents thereof, and means interposed between said by-pass passages for diverting the flow of material through the radiator and through the warming passage alternately in accordance with the condition of the thermal sensitive liquid.

8. A cooler for a thermally sensitive liquid including a pair of radiators connected in series, said radiators having therein circulatory passages through which the liquid will flow freely when warm and through which the flow of the liquid is retarded when cool, a warming compartment, completely surrounding each radiator and means for diverting the incoming liquid alternately through the radiators and the warming compartments in accordance with the degree of flow resistance within the radiators.

9. A cooler for a thermally sensitive liquid including a radiator mechanism having therein circulatory passages through which the liquid will flow freely when warm and through which the flow of the liquid is retarded when cool, a pair of by-pass passages connected in tandem for the incoming liquid, the circulation of which through the radiator mechanism is resisted by the chilled contents thereof, said by-pass passages being disposed in relation with the radiator so as to transfer warmth thereto to recondition its contents, and a valve intermediate said by-pass passages for controlling the flow of the liquid.

10. A cooler for a thermally sensitive liquid including a radiator mechanism having therein circulatory passages through which the liquid will flow freely when warm and through which the flow of the liquid is retarded when cool, and a pair of thermal compartments connected in series through which incoming liquid is automatically by-passed for reconditioning the contents of the radiator by the warming effect thereof, and valve means connected intermediate said compartments for controlling the flow of the liquid.

11. A temperature regulator for thermally sensitive liquids, comprising multiple interconnected units, each including a radiator section and a warming compartment, a conduit interconnecting the outlet of the warming compartment of one unit with the inlet of the warming compartment of the other unit, a tensioned valve in said conduit adapted to create a back pressure in the first unit, a second conduit connecting the outlet of the radiator section of the first unit with the inlet of the radiator section of the second unit, and inlet orifices to the warming compartment and radiator section of the first unit and outlet orifices from the warming compartment and radiator section of the second unit.

12. A temperature regulator for thermally sensitive liquids, including multiple units, each unit including a warming compartment and a radiator section, the warming compartment of each unit intercommunicating with the radiator section of the same unit and with the warming compartment of a complementary unit, the radiator sections of the complementary units intercommunicating with each other, and an inlet orifice to the warming compartment of one unit and an outlet orifice from the warming compartment of the complementary unit, and a yielding resistance element resisting the flow of liquid from one unit to the other, substantially as specified.

13. A cooler for thermally sensitive liquid including a pair of radiators connected in series having therein circulatory passages through which the liquid will flow freely when warm and through which the flow of liquid is retarded when cool, means for automatically heating each of said radiators in accordance with the resistance to flow thereto for conditioning the material therein, and a valve mechanism connected intermediate said radiators for controlling the flow of the material.

14. A cooler for thermally responsive material including a pair of radiators connected in series having passages through which the material is circulated and within which the material will congeal when chilled, a passage for circulating the warm material in proximate relation with the congealed material within each of said radiators to reduce the flow resistance thereof, and means mounted intermediate the radiators for automatically controlling the flow of material alternately through the radiators or through the warming passage.

15. In a cooler for a congealable material, a pair of radiator compartments through which the material is circulatd when in condition, said compartments being connected in series, warming compartments associated with the radiator compartments for by-passing of fluid material when the material within the radiator compartments is congealed, at least one of said warming compartments completely surrounding one of said radiator compartments, and yielding resistance means retarding the flow of material through the warming compartments affording greater resistance to flow than the radiator compartments when the material therein is in fluid condition but less than the resistance of the radiator when the material is congealed.

In testimony whereof we have hereunto set our hands this 6th day of May A. D. 1931.

DUDLEY W. WATKINS.
REUBEN G. DYKEMAN.